(12) United States Patent
Nakamura et al.

(10) Patent No.: US 8,876,614 B2
(45) Date of Patent: Nov. 4, 2014

(54) FRP DRIVE SHAFT

(75) Inventors: Takato Nakamura, Saitama (JP); Naoki Kimoto, Saitama (JP)

(73) Assignee: Fujikura Rubber Ltd., Tokyo (JP)

( * ) Notice: Subject to any disclaimer, the term of this patent is extended or adjusted under 35 U.S.C. 154(b) by 0 days.

(21) Appl. No.: 13/393,052

(22) PCT Filed: May 28, 2010

(86) PCT No.: PCT/JP2010/059075
§ 371 (c)(1),
(2), (4) Date: Feb. 28, 2012

(87) PCT Pub. No.: WO2011/024527
PCT Pub. Date: Mar. 3, 2011

(65) Prior Publication Data
US 2012/0157217 A1    Jun. 21, 2012

(30) Foreign Application Priority Data
Aug. 31, 2009  (JP) .................................. 2009-199988

(51) Int. Cl.
*F16D 1/068* (2006.01)
*F16D 1/08* (2006.01)
*F16C 3/02* (2006.01)
*F16D 1/10* (2006.01)

(52) U.S. Cl.
CPC .............. *F16C 3/026* (2013.01); *F16D 1/0858* (2013.01); *F16D 1/087* (2013.01); *F16D 2001/103* (2013.01); *F16D 2001/102* (2013.01)
USPC .......................................... 464/181; 464/182

(58) Field of Classification Search
USPC ............ 464/181, 182, 183; 403/359.1, 359.5, 403/359.6, 383
See application file for complete search history.

(56) References Cited

U.S. PATENT DOCUMENTS

| 4,248,062 | A | * | 2/1981 | McLain et al. | ................. 464/181 |
| 4,451,245 | A | * | 5/1984 | Hornig et al. | ................. 464/181 |
| 4,706,364 | A | * | 11/1987 | Aubry | ........................ 464/181 X |
| 4,747,806 | A | * | 5/1988 | Krude et al. | ................... 464/182 |

(Continued)

FOREIGN PATENT DOCUMENTS

| DE | 29614242 U1 | 10/1996 |
| EP | 0059163 A1 | 9/1982 |

(Continued)

OTHER PUBLICATIONS

International Search Report for PCT/JP2010/059075 dated Aug. 11, 2010.

(Continued)

*Primary Examiner* — Gregory Binda
*Assistant Examiner* — Matthieu Setliff
(74) *Attorney, Agent, or Firm* — McCormick, Paulding & Huber LLP

(57) ABSTRACT

An FRP drive shaft is formed by joining metal end-joints to each end of an FRP cylinder, wherein each of the metal end-joints includes a press-fitting joint having a serrated portion which is press-fitted into the FRP cylinder, and a cylindrical outer collar which is fixed to an outer periphery of the FRP cylinder, and non-circular engaging portions which are engaged with each other to transfer rotation are formed on the press-fitting joint and the cylindrical outer collar, respectively.

14 Claims, 9 Drawing Sheets

(56) References Cited

U.S. PATENT DOCUMENTS

| | | | | |
|---|---|---|---|---|
| 4,838,831 A | * | 6/1989 | Rumberger | 464/182 X |
| 4,895,351 A | * | 1/1990 | Devaud | 464/181 X |
| 4,930,204 A | * | 6/1990 | Schurter | |
| 5,230,661 A | * | 7/1993 | Schreiber et al. | 464/181 |
| 5,318,374 A | * | 6/1994 | Rumberger | 464/182 X |
| 5,322,580 A | * | 6/1994 | McIntire et al. | 464/181 X |
| 5,342,464 A | * | 8/1994 | McIntire et al. | 464/181 X |
| 5,421,781 A | * | 6/1995 | Mackellar | 464/181 |
| 5,823,703 A | * | 10/1998 | Thomas et al. | 464/182 X |
| 7,192,213 B2 | * | 3/2007 | Mermoz | |
| 2003/0157988 A1 | | 8/2003 | Nonogaki et al. | |

FOREIGN PATENT DOCUMENTS

| | | |
|---|---|---|
| EP | 0186624 A1 | 7/1986 |
| EP | 0537035 A1 | 4/1993 |
| EP | 0877173 A1 | 11/1998 |
| JP | S5239952 U | 3/1977 |
| JP | 59-77505 | 5/1984 |
| JP | 59-126115 | 7/1984 |
| JP | 01-91118 | 6/1989 |
| JP | 04-136522 | 5/1992 |
| JP | 04-181021 | 6/1992 |
| JP | 07-083240 | 3/1995 |
| JP | 2001-090764 | 4/2001 |
| JP | 2003-237396 | 8/2003 |
| JP | 2006-103032 | 4/2006 |

OTHER PUBLICATIONS

Extended European Search Report dated Feb. 11, 2014 from corresponding EP Application No. 10811580.9.

\* cited by examiner

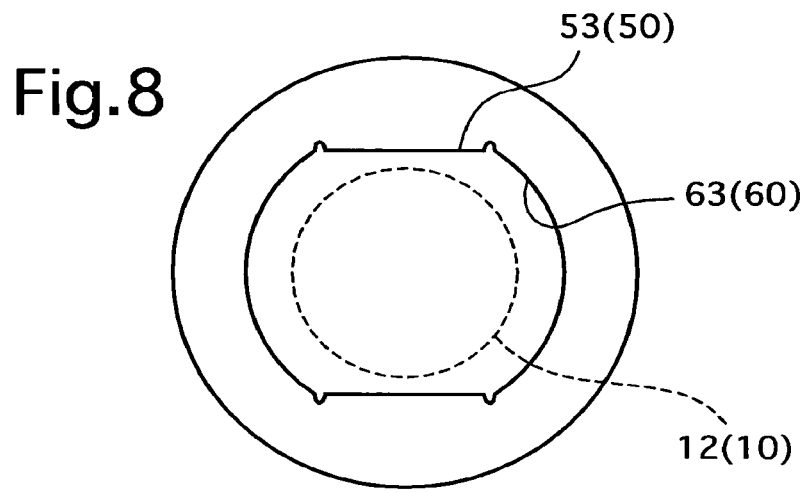
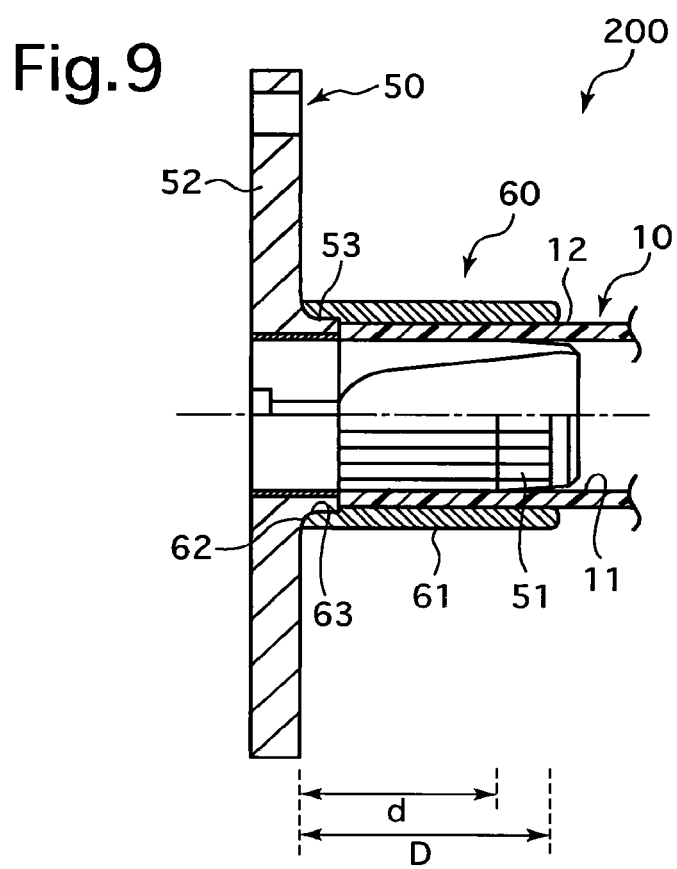

ately achieve a high transfer torque.

FRP DRIVE SHAFT

CROSS REFERENCE TO RELATED APPLICATIONS

This application claims the priority of Japanese patent application No. 2009-199988, filed on Aug. 31, 2009 and PCT Application No. PCT/JP2010/059075, filed on May 28, 2010, the disclosures of which are incorporated herein by reference in their entirety.

TECHNICAL FIELD

The present invention relates to an FRP (fiber reinforced plastic) drive shaft which is used for, e.g., a propeller shaft (drive shaft) of a vehicle.

BACKGROUND OF THE INVENTION

FRP drive shafts are made by joining metal end joints to both ends of an FRP (Fiber Reinforced Plastics) cylinder and have the advantage of being lightweight. However, how to increase the joint strength between the FRP cylinder and each end joint has been a technical problem to be solved, and various proposals have been submitted for solving this problem as discussed below.

TECHNICAL PROBLEM

Japanese utility model application publication No. H1-91118 proposes a new fiber structure for the FRP cylinder on the precondition that the FRP cylinder and the end joints are mutually joined via joining members which radially extend through both the FRP cylinder and the end joints. However, in such a structure that mutually joins the FRP cylinder and the end joints via the radial through-members, stress is concentrated on the radial penetrations, so that the FRP cylinder or the through-members still easily fracture.

Japanese utility model application publication No. H6-32726 proposes that each end joint is configured of a metal yoke which is inserted into the FRP cylinder and fixed thereto and an outer collar which is fitted on an outer periphery of the FRP cylinder and fixed to the metal yoke by welding. However, there is a high possibility of the FRP cylinder being damaged by heat when the metal yoke and the outer collar are welded to each other, so that it is extremely difficult to achieve the mechanical strength noted in Japanese utility model application publication No. H6-32726.

Japanese unexamined patent application publication No. 2004-308700 proposes a structure in which an intermediate cylindrical member is installed between the FRP cylinder and each end joint and in which the outer and inner peripheries of each intermediate cylindrical member are in serration-engagement and spline-engagement with the FRP cylinder and the end joint, respectively. However, there is a high possibility of the FRP cylinder itself being damaged when a torque is transferred from the end joints to the FRP cylinder. In the case where the FRP cylinder, in particular, is configured a plurality of FRP layers by winding a plurality of prepregs, which are made by impregnating thermosetting resin sheets with carbon reinforcement fibers, into a cylinder and thermally curing the plurality of prepregs thus wound, a peeling phenomenon may occur between the layers, which may lead to breakage.

The present invention has been devised in view of the above described issues, and an object of the present invention is to provide an FRP drive shaft in which the joint strength between the FRP cylinder and the metal joint fixed at each end thereof can be enhanced, thereby being capable of achieving a high transfer torque.

SUMMARY OF THE INVENTION

The inventors of the present invention have concluded that breakage of the FRP cylinder of an FRP drive shaft is caused by the occurrence of a large difference in stress between the inner and outer peripheries of the FRP cylinder and also due to the occurrence of a peeling phenomenon between the layers because a large force is exerted on the inner periphery of the FRP cylinder via the end joints that are inserted into the cylinder while merely a force is indirectly exerted on the outer periphery of the FRP cylinder via the wall thickness thereof when a torque is transferred between the FRP cylinder and the end joints that are inserted into both ends of the FRP cylinder, and consequently, the inventors have achieved the present invention in view of this conclusion.

The present invention is characterized by a FRP drive shaft which is formed by joining metal end-joints to each end of an FRP cylinder, wherein each of the metal end-joints includes a press-fitting joint having a serrated portion which is press-fitted into the FRP cylinder, and a cylindrical outer collar which is fixed to an outer periphery of the FRP cylinder, and non-circular engaging portions which are engaged with each other to transfer rotation are formed on the press-fitting joint and the cylindrical outer collar, respectively.

Considering workability, it is desirable that the non-circular engaging portions be configured specifically from an oval-shaped hole and an oval-shaped cross sectional shaft portion (a hole and a shaft having a pair of plane-parallel portions), respectively.

In a more specific embodiment, a rod-shaped press-fitting joint, the diameter of which at the serrated portion is the maximum, is used as the press-fitting joint, and the cylindrical outer collar comprises a cylindrical portion which is fixed to the outer periphery of the FRP cylinder, and an end face portion which is positioned at an end of the cylindrical portion. In addition, a non-circular engaging hole having a size within the outer diameter of the FRP cylinder is formed in this end face portion, and a non-circular cross sectional shaft portion which is engaged in the non-circular engaging hole of the cylindrical outer collar is formed on the press-fitting joint. In this embodiment, it is possible to fit the cylindrical outer collar onto the outer periphery of the FRP cylinder and to bond and fix the former to the latter while simultaneously to fit the non-circular engaging hole of the cylindrical outer collar onto the non-circular cross sectional shaft portion of the press-fitting joint after press-fitting the serrated portion of the press-fitting joint into the inner periphery of the FRP cylinder.

Additionally, in an embodiment in which the press-fitting joint comprises a large-diameter flange portion which is continuous with the serrated portion and larger in diameter than the serrated portion, the cylindrical outer collar comprises an end face portion having a greater diameter than the FRP cylinder, and a non-circular engaging hole is formed in the end face portion to have a size that exceeds the outer diameter of the FRP cylinder. On the other hand, a non-circular cross sectional shaft portion which is engaged in the non-circular engaging hole is formed on the press-fitting joint to be positioned between the serrated portion and the large-diameter flange portion. In this embodiment, after the cylindrical outer collar is fitted onto the outer periphery of the FRP cylinder and fixed thereto, the serrated portion of the press-fitting joint is press-fitted into the FRP cylinder, while the non-circular cross sectional shaft portion is simultaneously fitted into the non-circular engaging hole of the cylindrical outer collar. The press-fitting joint that includes the serrated portion and the large-diameter flange portion can be composed of a single member, or two members: a serrated shaft portion and a large-diameter flange portion which are joined to each other afterwards.

From the viewpoint of strength, it is desirable that the axial length of the cylindrical outer collar that is positioned outside of the FRP cylinder be substantially identical to or greater than the effective serration length of the serrated portion that is positioned inside of the FRP cylinder. In the latter case, if the cylindrical portion of the cylindrical outer collar is joined to the FRP cylinder with a through-rivet (blind rivet) which radially penetrates through a portion of the cylindrical portion in which no part of the serrated portion exists, the joint strength between the FRP cylinder and the cylindrical outer collar can be increased.

The outer collar can be configured of an entire cylindrical member, or of two split outer collars that each have a semi-cylindrical cross section and a coupling member for coupling the two split outer collars. According to this configuration, assembly is facilitated since it is not necessary for the inner peripheral surface of the cylindrical outer collar to pass over the press-fitting joint from the axial direction.

It is desirable that reinforcement FRP layers which contain fiber components extending in a circumferential direction be formed into cylinders on the outer periphery of the FRP cylinder at both ends thereof, respectively in order to increase the resistance and strength with respect to the press-fitting of the serrated portion.

Although the FRP drive shaft according to the present invention is applicable regardless of the structure, resin (e.g., thermoplastic resin) or fibers of the FRP cylinder, a high-strength FRP drive shaft can be achieved in which delamination of the CFRP (carbon fiber reinforced plastic) layers can be prevented from occurring in the case where the present invention is applied to a CFRP cylinder which is configured of a plurality of CFRP layers by winding a plurality of prepregs, which are made by impregnating thermosetting resin sheets with carbon reinforcement fibers, into a cylinder and thermally curing the plurality of prepregs thus wound.

EFFECTS OF THE INVENTION

In the FRP drive shaft according to the present invention, since the end joint is configured of a press-fitting joint having a serrated portion which is press-fitted into the FRP cylinder, and a cylindrical outer collar which is fixed to an outer periphery of the FRP cylinder, and since non-circular engaging portions which are engaged with each other to transfer rotation are formed on the press-fitting joint and the cylindrical outer collar, respectively, a rotational torque is exerted simultaneously on both the inside and the outside of the FRP cylinder when a torque is transferred between the end joint and the FRP cylinder. Accordingly, breakage of the FRP cylinder caused by a difference in load (torque) between the inside and the outside of the FRP cylinder does not easily occur. Specifically, in the case where the FRP cylinder is configured of a plurality of CFRP layers winding a plurality of prepregs, which are made by impregnating thermosetting resin sheets with reinforcement fibers, into a cylinder and thermally curing the plurality of prepregs thus wound, peeling damage is prevented from occurring because a large peeling load is not exerted on the plurality of FRP layers.

BRIEF DESCRIPTION OF THE DRAWINGS

FIG. 8 is a cross sectional view taken from the line VIII-VIII shown in FIG. 7 that shows non-circular engaging portions of a press-fitting joint and a cylindrical outer collar;

FIG. 9 is a fragmentary sectional view showing a first modified embodiment of the FRP drive shaft shown in FIG. 6;

FIRST EMBODIMENT

Description of the Preferred Embodiments

Figure 1:
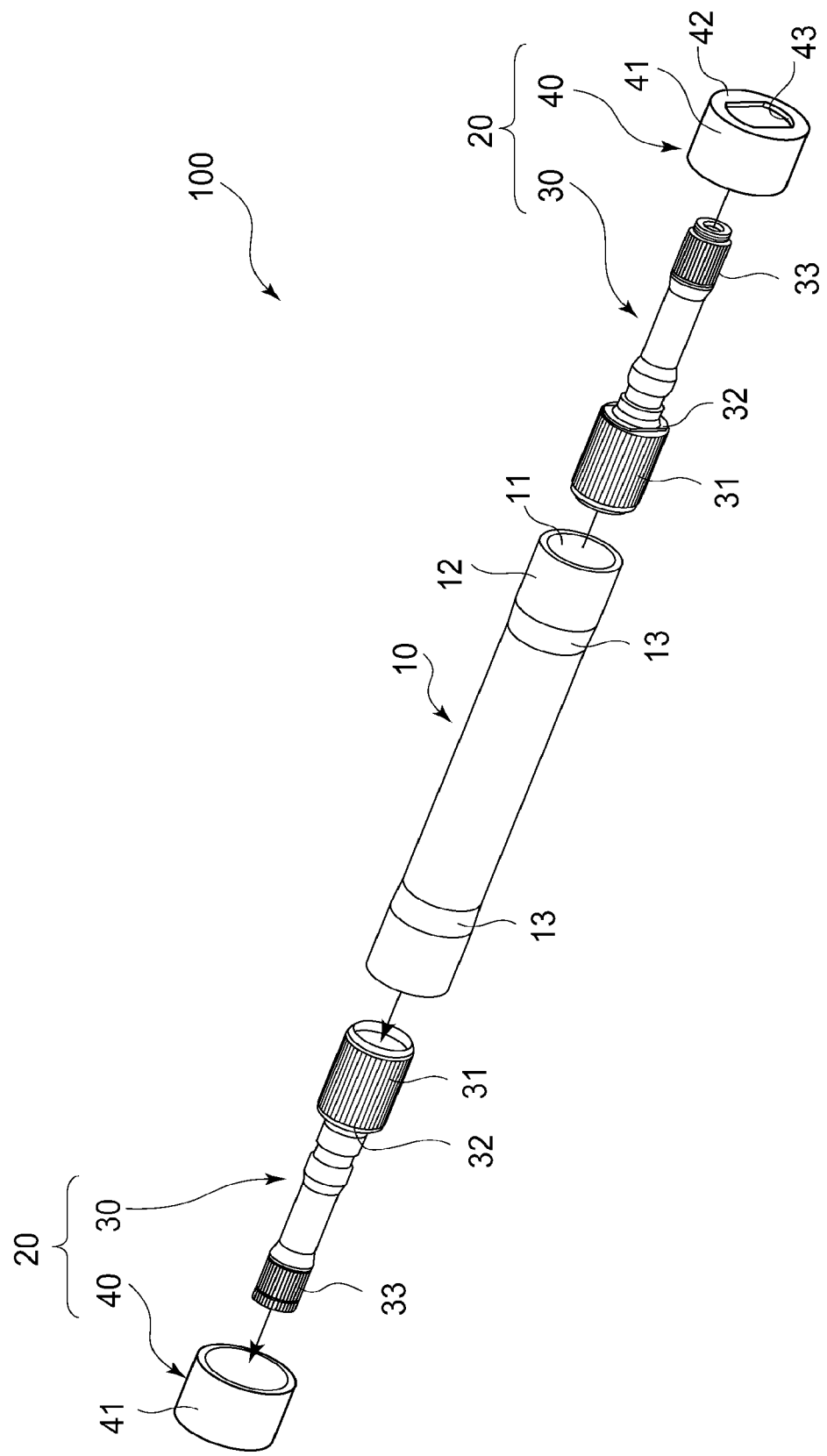
FIG. 1 is a perspective view of a first embodiment of an FRP drive shaft according to the present invention, showing an exploded state thereof.
Figure 2:
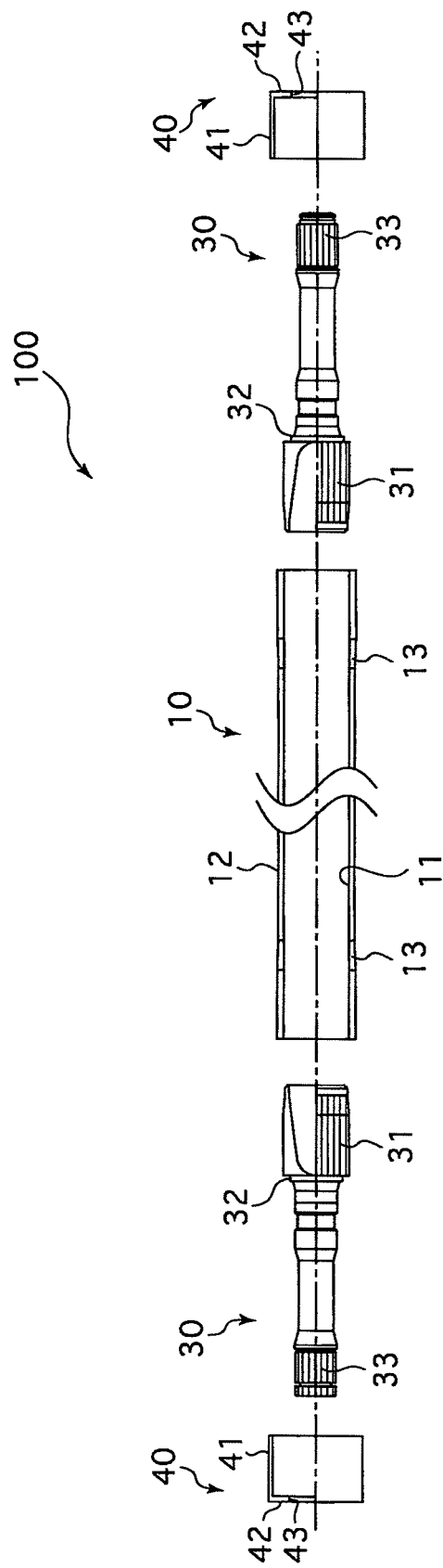
FIG. 2 is a cross sectional view of the FRP drive shaft.
Figure 3:
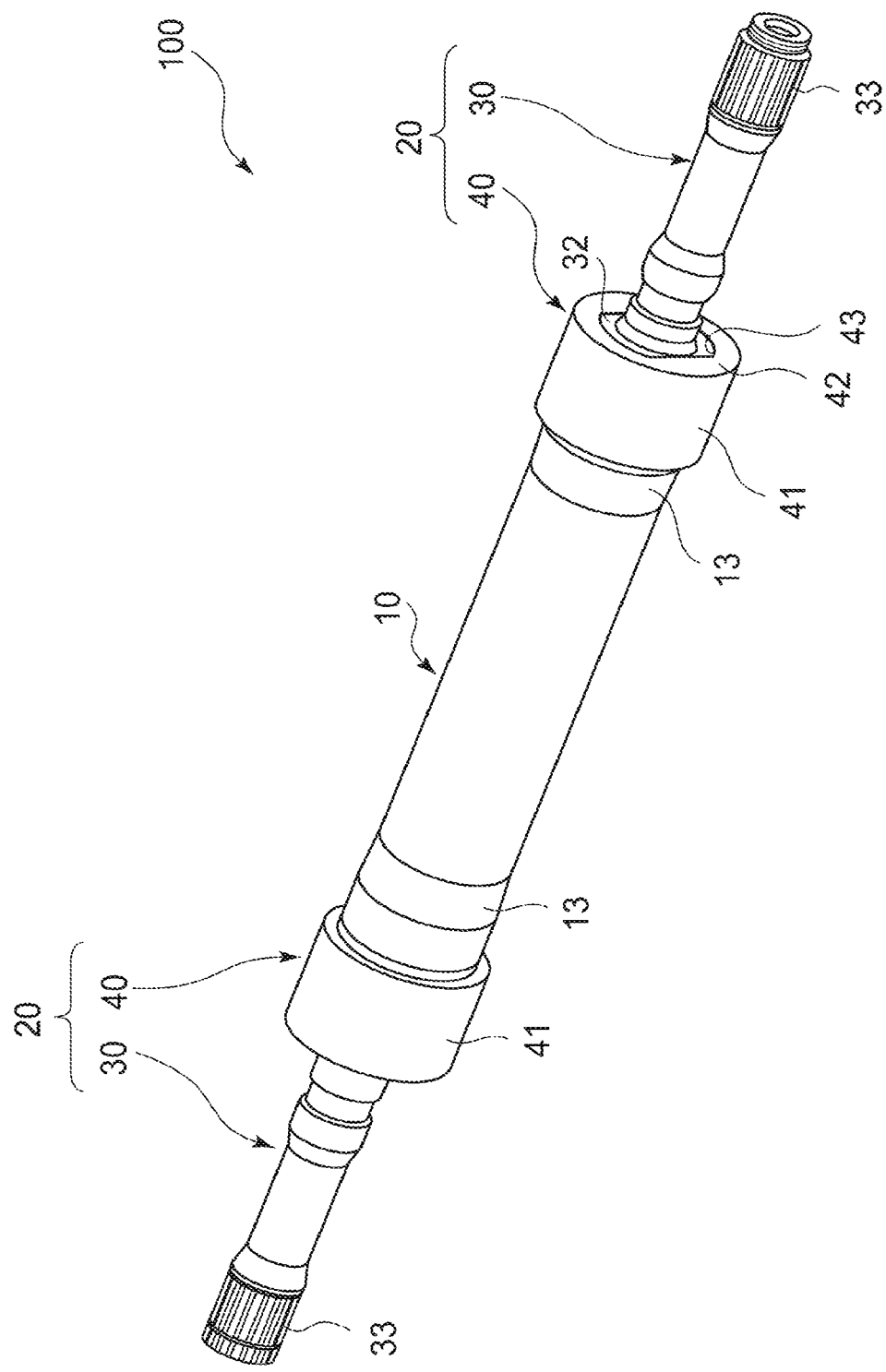
FIG. 3 is a perspective view of the first embodiment of the FRP drive shaft, showing an assembled state thereof.
Figure 4:
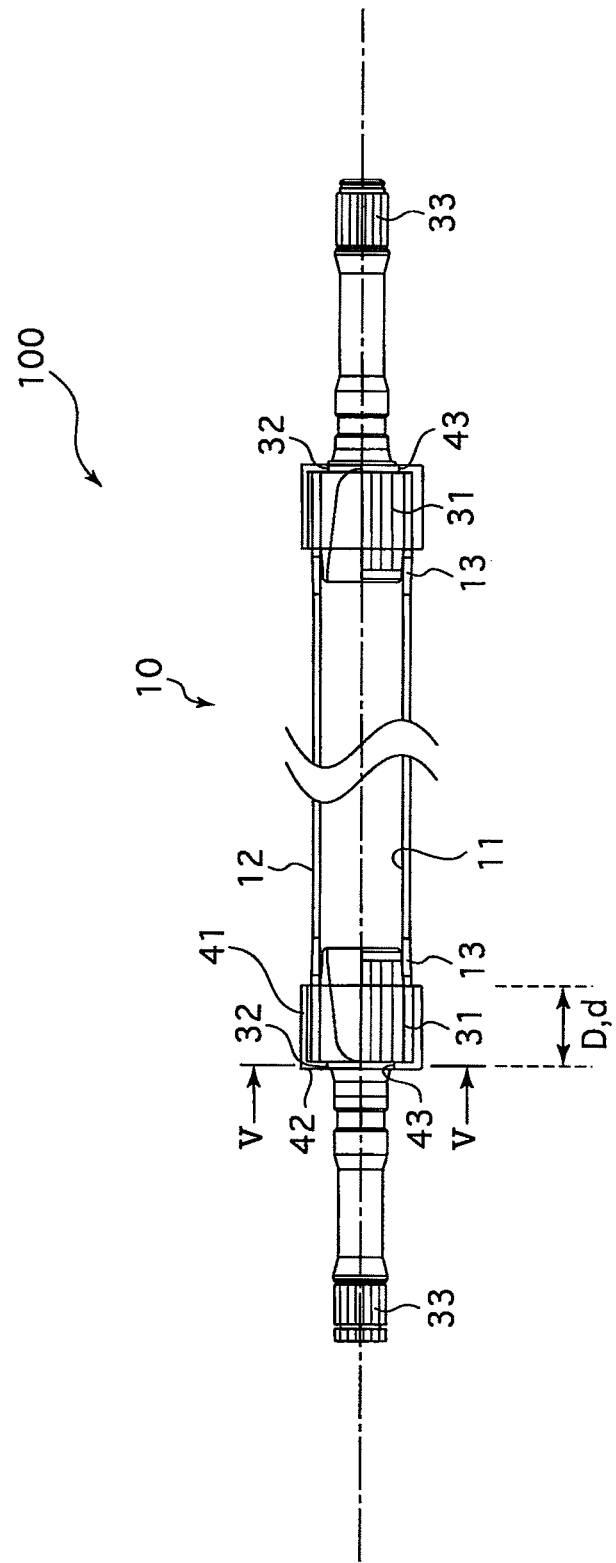
FIG. 4 is a cross sectional view of the first embodiment of the FRP drive shaft.

FIGS. 1 through 5 show a configuration of a first embodiment of an FRP drive shaft 100 according to the present invention. The FRP drive shaft 100 is made by two joining end joints 20 made of metal to both ends of an FRP cylinder 10, respectively. In the present embodiment, the two end joints 20 are mutually identical in structure, thus designated by the same reference numerals.

The FRP cylinder 10 is configured of a plurality of CFRP layers by winding a plurality of prepregs, which are made by impregnating thermosetting resin sheets with carbon reinforcement fibers, into a cylinder and thermally curing the plurality of prepregs thus wound.

The end joints 20 each include a press-fitting joint 30 and a cylindrical outer collar 40. The press-fitting joint 30 has a serrated portion 31 which is press-fitted into an inner periphery 11 of the FRP cylinder 10, and the cylindrical outer collar 40 is bonded to an outer periphery 12 of the FRP cylinder 10 to be fixed thereto. Reinforcement FRP layers 13 which include fiber components extending in a circumferential direction are formed on the FRP cylinder 10 at both ends thereof and shaped into cylinders to improve the resistance properties and strength to the press-fitting of the serrated potions 31.

The press-fitting joint 30 is configured from a rod-shaped press-fitting joint, the diameter of which is maximum at the serrated portion 31. A non-circular cross sectional shaft portion (oval-shaped cross sectional shaft portion) 32 is formed on the press-fitting joint 30 to be continuous with the serrated portion 31, and a rotational transfer portion (serrated connection portion) 33 is formed at the opposite end of the press-fitting joint 30 from the serrated portion 31.

The cylindrical outer collar 40 comprises a cylindrical portion 41 which is bonded to the outer periphery 12 of the FRP cylinder 10 to be fixed thereto and an end face portion 42 positioned at an end of the cylindrical portion 41, and a non-circular engaging hole (oval-shaped hole) 43 having a size within the outer diameter of the FRP cylinder 10 is formed in the end face portion 42.

Figure 5:
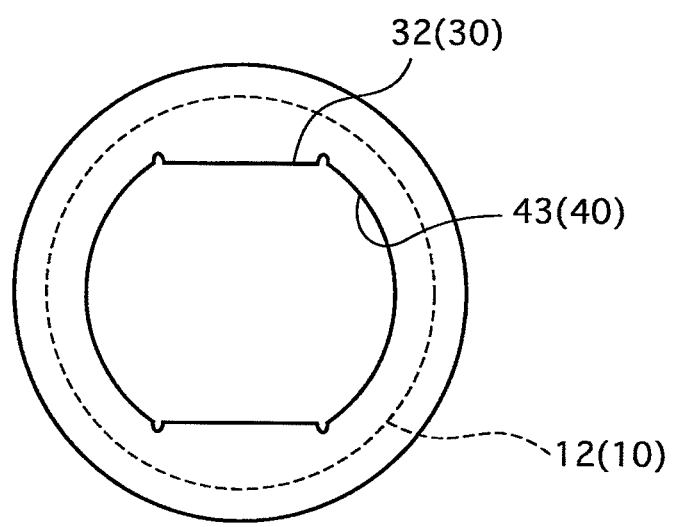
FIG. 5 is a cross sectional view taken from the line V-V shown in FIG. 4 that shows non-circular engaging portions of a press-fitting joint and a cylindrical outer collar.

As shown in FIG. 5, the non-circular cross sectional shaft portion 32 of the press-fitting joint 30 and the non-circular engaging hole 43 of the cylindrical outer collar 40 constitute non-circular engaging portions which are engaged with each other to transfer rotation.

The FRP drive shaft 100 that has the above described structure is assembled by fitting the cylindrical outer collars 40 onto the outer periphery 12 of the FRP cylinder 10 and bonding and fixing the former to the latter while simultaneously fitting the non-circular engaging holes 43 of the cylindrical outer collars 40 onto the non-circular cross sectional shaft portions 32 of the press-fitting joints 30 after press-fitting the serrated portions 31 of the press-fitting joints 30 into the inner periphery 11 of the FRP cylinder 10 (FIGS. 1 through 4). In the shaft assembled state shown in FIG. 4, the axial length D of the cylindrical portion 41 of the cylindrical outer collar 40 that is positioned outside the FRP cylinder 10 is substantially the same as the effective serration length d of the serrated portion 31 that is positioned inside the FRP cylinder 10. The term "effective serration length" refers to the axial length of that portion of the serrated portion 31 except for the tapered end thereof which is in mesh with the inner periphery 11 of the FRP cylinder 10.

In a situation in which the present embodiment of the FRP drive shaft 100 is used as a propeller shaft of a vehicle, the rotational transfer portions 33 at both ends of the press-fitting joints 30 are connected to an engine rotary part and a differential gear (not shown), respectively, and a rotational torque is transferred between the end joints 20 and the FRP cylinder 10 upon being exerted on the FRP drive shaft 100.

In the present embodiment, the serrated portions 31 of the press-fitting joint 30 are press-fitted into the inner periphery 11 of the FRP cylinder 10, the cylindrical outer collars 40 are bonded to the outer periphery 12 of the FRP cylinder 10 to be fixed thereto, and the non-circular cross sectional shaft portions 32 of the press-fitting joints 30 and the non-circular engaging holes 43 of the cylindrical outer collars 40 constitute non-circular engaging portions which are engaged with each other to transfer rotation, which makes it possible to increase the joint strength between the FRP cylinder 10 and the end joints 20 and achieve a high transfer torque. In addition, since a rotational torque is exerted simultaneously on both the inside and the outside of the FRP cylinder 10, breakage of the FRP cylinder 10 caused by a difference in loading (torque) between the inside and the outside of the FRP cylinder 10 does not easily occur. Specifically in the case where the FRP cylinder 10 is configured of a plurality of FRP layers made by winding a plurality of prepregs, which are made by impregnating thermosetting resin sheets with reinforcement fibers, into a cylinder and thermally curing the plurality of prepregs thus wound, peeling damage is prevented from occurring because no great peeling load is exerted on the plurality of FRP layers.

Figure 6A:
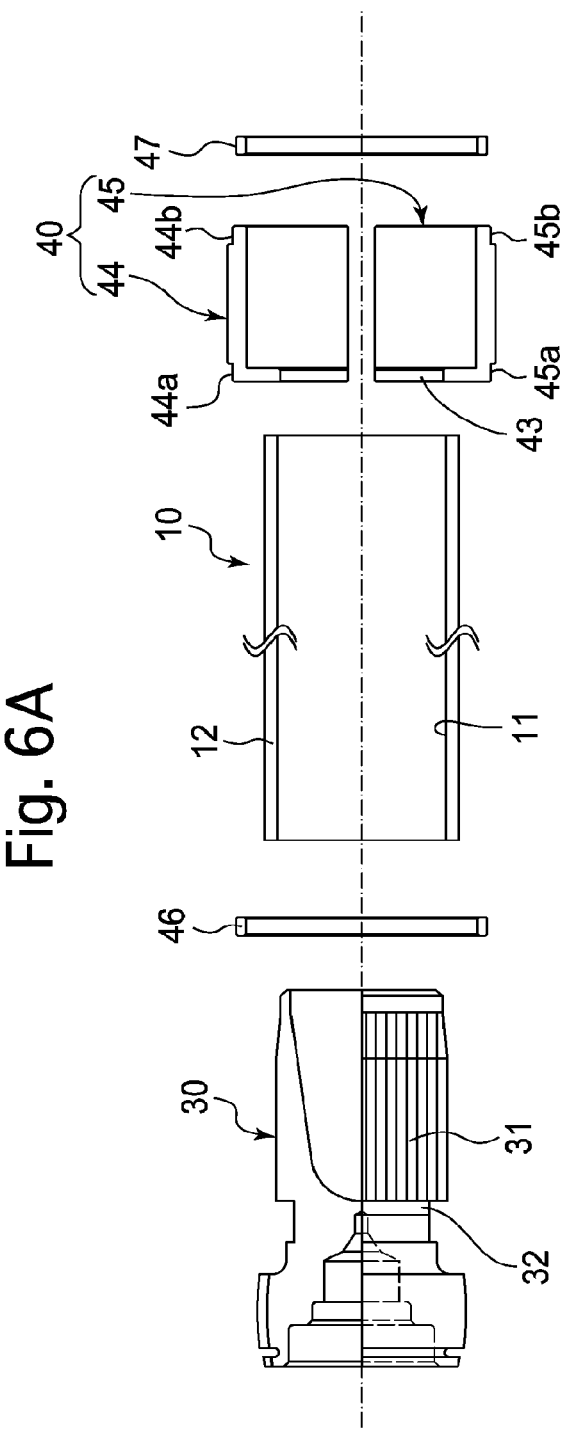
FIG. 6 show fragmentary sectional views of a modified embodiment of the cylindrical outer collar, wherein (A) shows an exploded state and (B) shows an assembled state.
Figure 6B:
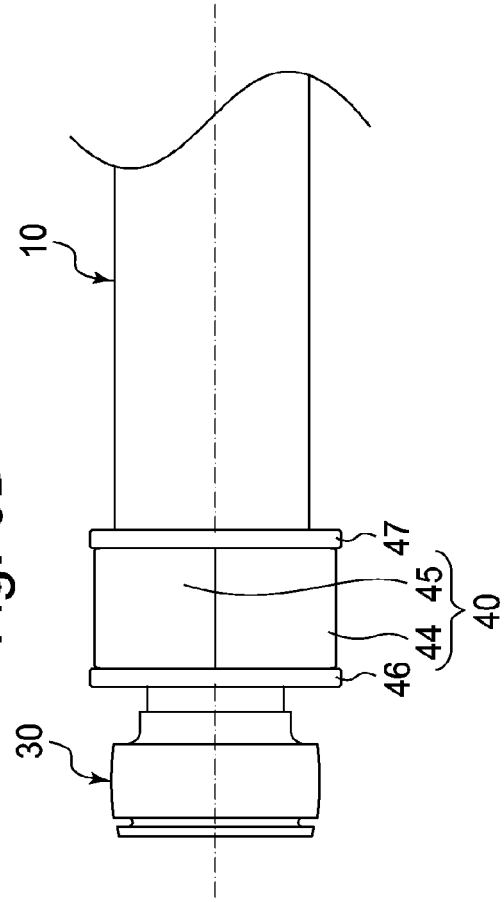

FIG. 6 shows a modified embodiment of the cylindrical outer collar 40 which is configured of two semi-cylindrical split outer collars 44 and 45 and ring members (coupling members) 46 and 47 for coupling the two semi-cylindrical split outer collars 44 and 45. Specifically, after the serrated portions 31 of the press-fitting joints 30 are press-fitted into the inner periphery 11 of the FRP cylinder 10, the split outer collars 44 and 45 are butt-joined to each other so as to cover the outer periphery 12 of the FRP cylinder 10 from radial directions, and the ring members (coupling members) 46 and 47 which are fitted on the outer periphery 12 of the FRP cylinder 10 in advance are respectively fitted on small-diameter end portions 44a and 44b and small-diameter end portions 45a and 45b of the split outer collars 44 and 45. The split outer collars 44 and 45 can additionally be bonded or welded to each other. Using the above described operations, the split outer collars 44 and 45 and the ring members 46 and 47 are assembled to complete the cylindrical outer collar 40. According to this structure, the inner periphery of the cylindrical outer collar 40 is not required to be fit onto the press-fitting joint 30 in the axial direction, hence, facilitating the assembling operation.

SECOND EMBODIMENT

Figure 7:
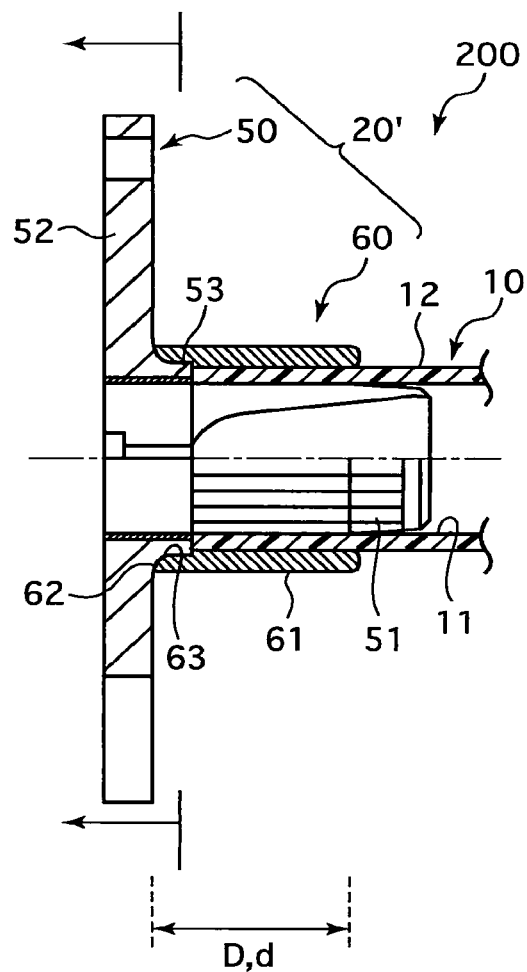
FIG. 7 is a fragmentary sectional view showing the joint between the FRP cylinder and an end joint of a second embodiment of the FRP drive shaft according to the present invention.

FIG. 7 is a sectional view showing the joint between the FRP cylinder 10 and an end joint 20' of a second embodiment of the FRP drive shaft 200 according to the present invention. Elements similar to those of the first embodiment are designated by the same reference numerals and descriptions of these elements are omitted.

The press-fitting joint 50 of this embodiment has a serrated portion 51 which is press-fitted into the inner periphery 11 of the FRP cylinder 10 and a large-diameter flange portion 52 which is continuous with the serrated portion 51 and greater in diameter than the serrated portion 51. In addition, a non-circular cross sectional shaft portion (oval-shaped cross sectional shaft portion) 53 is formed on the press-fitting joint 50 and is positioned between the serrated portion 51 and the large-diameter flange portion 52. As shown in FIG. 7, the press-fitting joint 50 is composed of two members, i.e., a serrated shaft portion having the serrated portion 51, and a large-diameter flange portion which includes the large-diameter flange portion 52 and is joined to this serrated shaft portion. In this connection, the press-fitting joint 50 can also be configured of a single member which integrally includes the serrated portion 51 and the large-diameter flange portion 52.

A cylindrical outer collar 60 comprises a cylindrical portion 61 which is fixed to the outer periphery 12 of the FRP cylinder 10 and an end face portion 62 positioned at an end of the cylindrical portion 61, and a non-circular engaging hole (oval-shaped hole) 63 is formed in the end face portion 62. The end face portion 62 is formed to have a greater diameter than the FRP cylinder 10, and the non-circular engaging hole 63 is formed to have a size exceeding the outer diameter of the FRP cylinder 10.

According to this structure, as shown in FIG. 8, also in the present embodiment in which the press-fitting joint 50 comprises the large-diameter flange portion 52 that is greater in diameter than the serrated portion 51, the non-circular cross sectional shaft portion 53 of the press-fitting joint 50 and the non-circular engaging hole 63 of the cylindrical outer collar 60 can constitute non-circular engaging portions which are engaged with each other to transfer rotation.

The FRP drive shaft 200 that has the above described structure is assembled by fitting the serrated portions 51 of the press-fitting joints 50 into the inner periphery 11 of the FRP cylinder 10 while simultaneously fitting the non-circular cross sectional shaft portions 53 of the press-fitting joint 50 into the non-circular engaging holes 63 of the cylindrical outer collars 60, after fitting the cylindrical outer collars 60 onto the outer periphery 12 of the FRP cylinder 10 and bonding and fixing the former to the latter. In the shaft assembled state shown in FIG. 7, the axial length D of the cylindrical portion 61 of the cylindrical outer collar 60 that is positioned outside the FRP cylinder 10 is substantially the same as the effective serration length d of the serrated portion 51 that is positioned inside the FRP cylinder 10. In a situation in which the FRP drive shaft 200 is used as a propeller shaft of a vehicle, the large-diameter flange portions 52 at both ends are connected to an engine rotary part and a differential gear, respectively.

Figure 10:
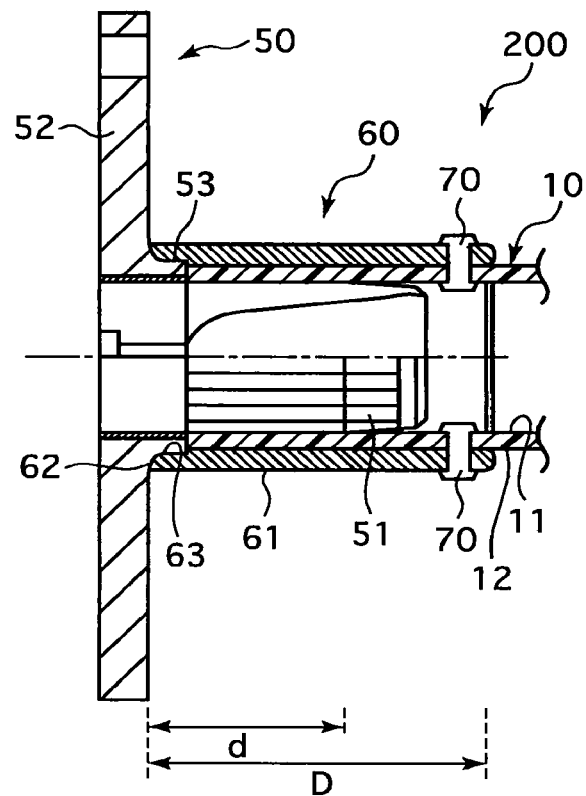
FIG. 10 is a fragmentary sectional view showing a second modified embodiment of the FRP drive shaft shown in FIG. 6.

As shown in FIG. 9, the axial length D of the cylindrical portion 61 of the cylindrical outer collar 60 that is positioned outside of the FRP cylinder 10 can be made greater than the effective serration length d of the serrated portion 51 that is positioned inside of the FRP cylinder 10. According to this configuration, if the cylindrical portion 61 of the cylindrical outer collar 60 is joined to the FRP cylinder 10 with through-rivets (blind rivets) 70 which radially penetrate through a portion of the cylindrical portion 61 in which no part of the serrated portion 51 exists as shown in FIG. 10, a higher strength can be achieved.

Figure 11:
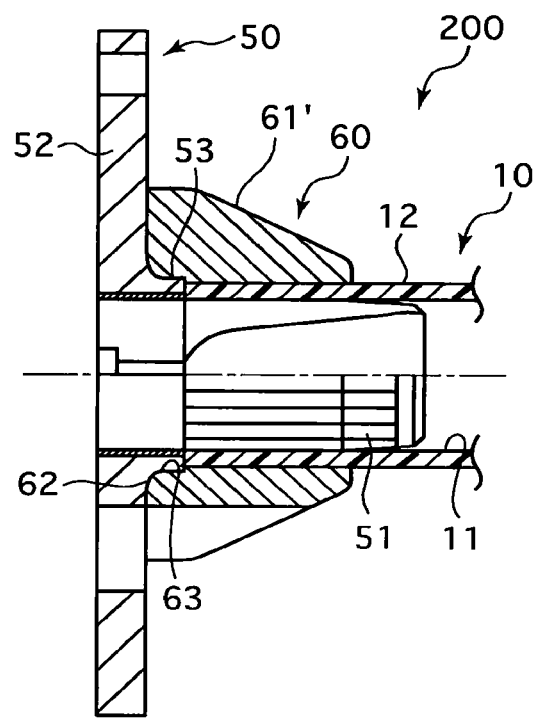
FIG. 11 is a fragmentary sectional view showing a third modified embodiment of the FRP drive shaft shown in FIG. 6.

Additionally, as shown in FIG. 11, the cylindrical portion of the cylindrical outer collar 60 can be modified into a tapered cylindrical portion 61' (conical outer collar), the thickness of which increases toward the end face portion 62.

Although the above described embodiments have been described by illustrating the case where the non-circular engaging portions of the press-fitting joint and the cylindrical outer collar are each formed into an oval shape (a hole and a shaft having a pair of plane-parallel portions), the non-circular engaging portions can each be formed into any shape such as a polygonal shape as long as they can transfer rotation (torque).

In the above described embodiments, the FRP cylinder is made as a multilayered cylinder made according to a prepreg method, and an effect of preventing delamination from occurring can be obtained in the case of a multilayer cylinder. However, the present invention is applicable regardless of the structure of the FRP cylinder and the manufacturing process thereof. For instance, the present invention can be applied to various FRP cylinders produced using a filament winding method or the like.

INDUSTRIAL APPLICABILITY

The FRP drive shaft according to the present invention can be widely utilized in various industrial fields as, e.g., a propeller shaft (drive shaft) or the like for an automobile.

REFERENCE SIGNS LIST

100 FRP drive shaft
10 FRP cylinder
11 Inner periphery of cylinder
12 Outer periphery of cylinder
13 Reinforcement FRP layer
20 End joint
30 Press-fitting joint
31 Serrated portion
32 Non-circular cross sectional shaft portion (oval-shaped cross sectional shaft portion)
33 Rotational transfer portion (serrated connection portion)
40 Cylindrical outer collar
41 Cylindrical portion
42 End face portion
43 Non-circular engaging hole (oval-shaped hole)
44 45 Split outer collar
46 47 Ring member (coupling member)
45a 45b 46a 46b Small-diameter end portion
200 FRP drive shaft
20' End joint
50 Press-fitting joint
51 Serrated portion
52 Large-diameter flange portion
53 Non-circular cross sectional shaft portion (oval-shaped cross sectional shaft portion)
60 Circular outer collar
61 Cylindrical portion
61' Tapered cylindrical portion
62 End face portion
63 Non-circular engaging hole (oval-shaped hole)
70 Through rivet (blind rivet)

The invention claimed is:

1. An FRP drive shaft which is formed by joining metal end-joints to each end of an FRP cylinder, wherein each of said metal end-joints comprises:
a press-fitting joint having a serrated portion which is press-fitted into said FRP cylinder, and
a cylindrical outer collar which is a separate member from said press-fitting joint and is fixed, using bond, onto an outer periphery of said FRP cylinder,
wherein said cylindrical outer collar and said press-fitting joint have non-circular engaging portions, respectively, which are directly engaged with each other, without any intervening component therebetween,
wherein said FRP cylinder and each of said metal end-joints are connected to form a unitary member and to integrally rotate with each other by a press-fit engaging portion between an inner surface of said FRP cylinder and said serrated portion of said press-fitting joint, by a bonded portion between the outer periphery of said FRP cylinder and an inner surface of said cylindrical outer collar, and by said non-circular engaging portions between said cylindrical outer collar and said press-fitting joint,
wherein said serrated portion and said non-circular engaging portions do not axially overlap.

2. The FRP drive shaft according to claim 1, wherein said non-circular engaging portions comprise an oval-shaped hole and an oval-shaped cross sectional shaft portion, respectively.

3. The FRP drive shaft according to claim 1, wherein said press-fitting joint comprises a rod-shaped press-fitting joint, the diameter of which is maximum at said serrated portion, wherein said cylindrical outer collar comprises a cylindrical portion which is fixed to said outer periphery of said FRP cylinder, and an end face portion which is positioned at an end of said cylindrical portion and in which a non-circular engaging hole having a size within an outer diameter of said FRP cylinder is formed, and wherein a non-circular cross sectional shaft portion which is engaged in said non-circular engaging hole of said cylindrical outer collar is formed on said press-fitting joint to be continuous with said serrated portion.

4. The FRP drive shaft according to claim 3, wherein an axial length of said cylindrical outer collar that is positioned outside of said FRP cylinder is substantially the same as an effective serration length of said serrated portion that is positioned inside of said FRP cylinder.

5. The FRP drive shaft according to claim 3, wherein an axial length of said cylindrical outer collar that is positioned outside of said FRP cylinder is greater than an effective serration length of said serrated portion that is positioned inside of said FRP cylinder.

6. The FRP drive shaft according to claim 1, wherein said press-fitting joint comprises a large-diameter flange portion which is continuous with said serrated portion and greater in diameter than said serrated portion, wherein said cylindrical outer collar comprises an end face portion having a greater diameter than said FRP cylinder, a non-circular engaging hole being formed in said end face portion to have a size that exceeds an outer diameter of said FRP cylinder, and wherein a non-circular cross sectional shaft portion which is engaged in said non-circular engaging hole is formed on said press-fitting joint to be positioned between said serrated portion and said large-diameter flange portion.

7. The FRP drive shaft according to claim 6, wherein said press-fitting joint comprises a single member which integrally includes said serrated portion and said large-diameter flange portion.

8. The FRP drive shaft according to claim 6, wherein said press-fitting joint comprises a serrated shaft portion having said serrated portion, and wherein said large-diameter flange portion which is joined to said serrated shaft portion.

9. The FRP drive shaft according to claim 1, wherein reinforcement FRP layers which include fiber components extending in a circumferential direction are formed into cylinders on the outer periphery of said FRP cylinder proximate both ends thereof, respectively.

10. The FRP drive shaft according to claim 1, wherein said FRP cylinder comprises a plurality of CFRP layers by winding a plurality of prepregs, which are made by impregnating thermosetting resin sheets with carbon reinforcement fibers, into a cylinder and thermally curing said plurality of prepregs thus wound.

11. The FRP drive shaft according to claim 1, wherein each of said outer collar and said press-fitting joint is formed as a single member.

12. An FRP drive shaft which is formed by joining metal end-joints to each end of an FRP cylinder, wherein each of said metal end-joints includes
 a press-fitting joint having a serrated portion which is press-fitted into said FRP cylinder to transmit torque between said press-fitting joint and said FRP cylinder, and
 a cylindrical outer collar which is fixed onto an outer periphery of said FRP cylinder, said cylindrical outer collar and said press-fitting joint having non-circular engaging portions which are engaged with each other to transmit torque between said press-fitting joint and said cylindrical outer collar,
 wherein said press-fitting joint comprises a rod-shaped press-fitting joint, the diameter of which is maximum at said serrated portion, said cylindrical outer collar comprises a cylindrical portion which is fixed to said outer periphery of said FRP cylinder, and an end face portion which is positioned at an end of said cylindrical portion and in which a non-circular engaging hole having a size within an outer diameter of said FRP cylinder is formed,
a non-circular cross sectional shaft portion which is engaged in said non-circular engaging hole of said cylindrical outer collar is formed on said press-fitting joint to be continuous with said serrated portion,
an axial length of said cylindrical outer collar that is positioned outside of said FRP cylinder is greater than an effective serration length of said serrated portion that is positioned inside of said FRP cylinder, and
said cylindrical portion of said cylindrical outer collar is joined to said FRP cylinder with a through-rivet which radially penetrates through a portion of said FRP cylinder in which no part of said serrated portion exists.

13. The FRP drive shaft according to claim 12, wherein said cylindrical outer collar comprises two split outer collars, each having a semi-cylindrical cross section and a coupling member for coupling said two split outer collars.

14. An FRP drive shaft which is formed by joining metal end-joints to each end of an FRP cylinder, wherein each of said metal end-joints comprises:
 a press-fitting joint that has a circular serrated portion which is press-fitted into said FRP cylinder, and has a non-circular engaging portion that is axially displaced from the circular serrated portion; and
 a cylindrical outer collar that has a circular portion fixed, using bond, directly onto an outer periphery of said FRP cylinder, to form a unitary member, and has a non-circular engaging portion that is axially displaced from the circular portion;
wherein said cylindrical outer collar and said press-fitting joint are separate members, which are directly engaged with each other by their non-circular engaging portions, without any intervening component therebetween, and
wherein said FRP cylinder and each of said metal end-joints are connected to integrally rotate with each other by a press-fit engaging portion between an inner surface of said FRP cylinder and said serrated portion of said press-fitting joint, by a bonded portion between the outer periphery of said FRP cylinder and an inner surface of said cylindrical outer collar, and by said non-circular engaging portions between said cylindrical outer collar and said press-fitting joint.

* * * * *